United States Patent
Qian et al.

(10) Patent No.: US 9,904,536 B1
(45) Date of Patent: Feb. 27, 2018

(54) SYSTEMS AND METHODS FOR ADMINISTERING WEB WIDGETS

(71) Applicant: Dell Software Inc., Aliso Viejo, CA (US)

(72) Inventors: Lijun Qian, Zhongshan (CN); Guoxiong Wu, Zhuhai (CN); Mary Cindy Ah Kioon, Zhuhai (CN); Michel Albert Brisebois, Renfrew (CA)

(73) Assignee: Quest Software Inc., Aliso Viejo, CA (US)

( * ) Notice: Subject to any disclaimer, the term of this patent is extended or adjusted under 35 U.S.C. 154(b) by 210 days.

(21) Appl. No.: 14/858,299

(22) Filed: Sep. 18, 2015

(51) Int. Cl.
*G06F 9/44* (2006.01)
*G06F 17/30* (2006.01)
*G06F 9/445* (2018.01)
*G06F 11/14* (2006.01)
*G06F 11/36* (2006.01)
*G06F 17/22* (2006.01)

(52) U.S. Cl.
CPC .......... *G06F 8/65* (2013.01); *G06F 8/71* (2013.01); *G06F 9/44536* (2013.01); *G06F 11/1433* (2013.01); *G06F 11/3672* (2013.01); *G06F 17/2288* (2013.01); *G06F 17/3089* (2013.01)

(58) Field of Classification Search
CPC .......... G06F 8/65; G06F 8/71; G06F 9/44536; G06F 11/1433; G06F 11/3672
See application file for complete search history.

(56) References Cited

U.S. PATENT DOCUMENTS 5,596,702 A 1/1997 Stucka et al.
6,367,077 B1 4/2002 Brodersen et al.
6,789,255 B1 9/2004 Pedrizetti et al.
7,073,172 B2 7/2006 Chamberlain
7,150,014 B2 12/2006 Graupner et al.
(Continued)

OTHER PUBLICATIONS

Alex Q. Chen, Widget Identification and Modification for Web 2.0 Access Technologies (WIMWAT), Sigaccess Newsletter, Issue 96, Jan. 2016, retrieved online on Oct. 31, 2017, pp. 11-18. Retrieved from the Internet<URL: http://delivery.acm.org/10.1145/1740000/1731851/p11-chen.pdf?ip=151.207.250.51&id=1731851&acc=ACTIVE%20SERVICE& key=C15944E53D0ACA63%2E>.*
U.S. Appl. No. 14/976,652, Wu et al.
Anzböck, Rainer, et al.; "Software Configuration, Distribution, and Deployment of Web-Services"; SEKE '02; Jul. 15-19, 2002; Ischia, Italy; pp. 649-656.
Cooper, Michael; "Charting a Course for Software Licensing and Distribution"; SIGUCCS '10; Oct. 24-27, 2010; Norfolk, Virginia; pp. 153-156.

(Continued)

*Primary Examiner* — Hanh T Bui

(57) ABSTRACT

In an embodiment, a method is performed by a computer system. The method includes determining a scope of widget discovery in a content-management system. The method further includes automatically identifying widget instances of the content-management system that are within the determined scope of widget discovery. In addition, the method includes discovering attributes of the identified widget instances on a per widget-instance basis. The method also includes storing in memory widget-instance relationship data comprising the determined attributes of the identified widget instances. Moreover, the method includes receiving a multi-widget-instance change definition, wherein the multi-widget-instance change definition articulates a specified change to unspecified widget instances which share a specified widget-instance attribute. Also, the method includes automatically identifying the unspecified widget instances based, at least in part, on a lookup of the specified widget-instance attribute in the widget-instance relationship data.

17 Claims, 12 Drawing Sheets

(56) References Cited

U.S. PATENT DOCUMENTS

| | | | |
|---|---|---|---|
| 7,340,737 B2 | 3/2008 | Ghercioiu et al. | |
| 7,373,643 B2 | 5/2008 | Radatti | |
| 7,496,910 B2 | 2/2009 | Voskuil | |
| 7,568,018 B1 | 7/2009 | Hove et al. | |
| 7,890,543 B2 | 2/2011 | Hunt et al. | |
| 7,913,235 B2 | 3/2011 | Rose et al. | |
| 7,971,202 B2 | 6/2011 | Bell et al. | |
| 8,302,093 B2 | 10/2012 | Berg et al. | |
| 8,407,683 B2 | 3/2013 | Cheng et al. | |
| 8,522,206 B2 * | 8/2013 | Chan | G06F 17/2288 717/170 |
| 8,612,967 B1 | 12/2013 | Delker | |
| 8,726,147 B1 | 5/2014 | Beatty et al. | |
| 8,918,775 B1 * | 12/2014 | Carpenter | G06F 9/44505 717/170 |
| 8,918,776 B2 | 12/2014 | Fei et al. | |
| 8,972,973 B2 | 3/2015 | Cavalaris et al. | |
| 9,009,693 B2 | 4/2015 | St. John et al. | |
| 2004/0199392 A1 | 10/2004 | Khatri et al. | |
| 2006/0041879 A1 | 2/2006 | Bower et al. | |
| 2008/0288955 A1 | 11/2008 | Brockway et al. | |
| 2009/0037830 A1 | 2/2009 | Kulkarni et al. | |
| 2009/0276206 A1 | 11/2009 | Fitzpatrick et al. | |
| 2010/0146378 A1 | 6/2010 | Bank et al. | |
| 2011/0179073 A1 | 7/2011 | Nilsson | |
| 2012/0291009 A1 | 11/2012 | Khare et al. | |
| 2012/0324418 A1 | 12/2012 | Fallon | |
| 2013/0013734 A1 * | 1/2013 | Garfinkle | H04L 67/16 709/217 |
| 2014/0201643 A1 * | 7/2014 | Brisebois | G06F 8/38 715/738 |

OTHER PUBLICATIONS

Bamboo Solutions; "Highlights of PM Central: SA12 How this Product Benefits your Business"; http://bamboo.docfactory.com/#!doc/Project_Management/PM_Central/topic:Highlights_of_PM_Central; Oct. 24, 2014; 1 page.

aarebrot.net; "Changing the Properties of an Existing Web Part using PowerShell"; http://aarebrot.net/blog/2010/09/changing-the-properties-of-an-existing-web-part-using-powershell/; Sep. 2, 2010; 3 pages.

Wikimedia Foundation, Inc.; "Microsoft SharePoint Designer"; https://en.wikipedia.org/wiki/Microsoft_Sharepoint_Designer; last modified on Aug. 14, 2015; 3 pages.

Lightningtools; "Lightning Conductor Web Part 2010: Manual 5.1"; last update Sep. 8, 2014; 110 pages.

The Microsoft Developer Network, "Machine Translation Services in SharePoint 2013", Jul. 16, 2012, 13 pages.

The Microsoft Developer Network, "Walkthrough: Localizing a Web Part", Dec. 2010, 16 pages.

geekswithblogs.net, "Sharep10nt, All About SharePoint 2010/2013", Dec. 14, 2010, 19 pages.

Xu, etal, "A Speed-based Adaptive Dynamic Parallel Downloading Technique", ACM, pp. 63-69, 2005.

Balzer, et al., "Application Downloading", IEEE, pp. 450-459, 1981.

Bodhuin, et al., "A Search-Based Approach for Dynamically Re-packaging Downloadable Applications", ACM, pp. 1-15, 2007.

Al-Jaroodi, et al., "Dual Direction Big Data Download and Analysis", ACM, pp. 98-101, 2014.

Liu, et al., "On the Impact of Concurrent Downloads", ACM, pp. 1300-1305, 2001.

* cited by examiner

| | | | |
|---|---|---|---|
| ⬚ Static Analyzer  ⬚ Dynamic Analyzer  ⬚ Single / Bulk Update | | | |
| Select Web Part types: * | qListView; | | |
| Select a Web Part Property: * | Skin Name ▾ | | |
| Select a Search Condition: | Equals ▾ | | |
| Enter a Property Value: | Windows7 | | |
| Set Property Value To: | MetroTouch | | |
| ⬚ Go!  ⬚ Reset  ⬚ View in Excel | | | |
| Web Part Title ▲ | Web Part Type | Web Part Page Path | ezEdit | Status |
| PDK release Dates (closed) | qListView | http://win-0p1ufik1gie/TestPages/qListView.aspx | | |
| qListView | qListView | http://win-0p1ufik1gie/wm/Pages/Employees.aspx | 🏠 | Succeeded |
| qListView | qListView | http://win-0p1ufik1gie/TestPages/qItemDisplay.aspx | 🏠 | Succeeded |
| qListView | qListView | http://win-0p1ufik1gie/TestPages/SearchTFS.aspx | 🏠 | Succeeded |
| qListView | qListView | http://win-0p1ufik1gie/TestPages/qDynamicLayout.aspx | 🏠 | Succeeded |
| qListView | qListView | http://win-0p1ufik1gie/TestPages/qListView.aspx | 🏠 | Succeeded |
| Total number of results: 6 | | | Succeeded: 6 / Failed:0 | |

| View by Farm | | | Usages | | | | | |
|---|---|---|---|---|---|---|---|---|
| Farm | Web App 1 ⑩ > | Site 1 ㊵ > | Web Part Page path | qListView | qSelector | qDataGrid | qTreeView | qTextbox > |
| | Web App 2 ㊷ > | Site 2 ⑩ > | /page1 | 2 | 1 | 3 | 1 | 2 |
| WP Web Parts | Web App 3 ⑪ > | Site 3 ⑤ > | /page2 | 0 | 1 | 0 | 2 | 0 |
| | Web App 4 ⑳ > | Site 4 ⑤ > | /page3 | 2 | 1 | 1 | 0 | 1 |
| ☐ Data Sources | Web App 5 ⑫ > | Site 5 ⑩ > | /page4 | 1 | 0 | 3 | 2 | 2 |
| | | Site 6 ⑫ > | /page5 | 1 | 1 | 3 | 2 | 2 |
| | | | /page6 | 0 | 2 | 3 | 2 | 2 |

FIG. 9

| Static Analyzer | Dynamic Analyzer | Single / Bulk Update |

| | |
|---|---|
| ▦ Farm | qListView > |
| | qSelector > |
| View by Web Parts Type | qDataGrid > |
| WP Web Parts | qTreeView > |
| | qTextBox > |
| ☐ Data Sources | qColorPicker > |

Usages

| Web Part Page path | Count |
|---|---|
| webapp1/site1/page1 | 2 |
| webapp2/site2/page2 | 1 |
| webapp3/site3/page3 | 1 |
| webapp4/site4/page4 | 2 |
| webapp5/site5/page5 | 2 |
| webapp6/site6/page6 | 2 |

SYSTEMS AND METHODS FOR ADMINISTERING WEB WIDGETS

BACKGROUND

Technical Field

The present disclosure relates generally to content management and more particularly, but not by way of limitation, to systems and methods for administering web widgets.

History of Related Art

In content-management systems based on, for example, Microsoft SharePoint®, web widgets known as web parts are frequently deployed that provide additional features and functionality to a web user interface. Web widgets can include, for example, form builders, calendars, media viewers, and the like. On any given content-management system, a web widget may be deployed on thousands of websites. It is sometimes desirable to make a change to multiple instances of various web widgets. However, such efforts are often complicated by a lack of knowledge regarding, for example, to which instances the change applies and how the change should be made.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In an embodiment, a method is performed by a computer system. The method includes determining a scope of widget discovery in a content-management system. The method further includes automatically identifying widget instances of the content-management system that are within the determined scope of widget discovery. In addition, the method includes discovering attributes of the identified widget instances on a per widget-instance basis. The method also includes storing in memory widget-instance relationship data comprising the determined attributes of the identified widget instances. Moreover, the method includes receiving a multi-widget-instance change definition, wherein the multi-widget-instance change definition articulates a specified change to unspecified widget instances which share a specified widget-instance attribute. Also, the method includes automatically identifying the unspecified widget instances based, at least in part, on a lookup of the specified widget-instance attribute in the widget-instance relationship data.

In one embodiment, an information handling system includes a processor. The processor is operable to implement a method. The method includes determining a scope of widget discovery in a content-management system. The method further includes automatically identifying widget instances of the content-management system that are within the determined scope of widget discovery. In addition, the method includes discovering attributes of the identified widget instances on a per widget-instance basis. The method also includes storing in memory widget-instance relationship data comprising the determined attributes of the identified widget instances. Moreover, the method includes receiving a multi-widget-instance change definition, wherein the multi-widget-instance change definition articulates a specified change to unspecified widget instances which share a specified widget-instance attribute. Also, the method includes automatically identifying the unspecified widget instances based, at least in part, on a lookup of the specified widget-instance attribute in the widget-instance relationship data.

In one embodiment, a computer-program product includes a non-transitory computer-usable medium having computer-readable program code embodied therein. The computer-readable program code is adapted to be executed to implement a method. The method includes determining a scope of widget discovery in a content-management system. The method further includes automatically identifying widget instances of the content-management system that are within the determined scope of widget discovery. In addition, the method includes discovering attributes of the identified widget instances on a per widget-instance basis. The method also includes storing in memory widget-instance relationship data comprising the determined attributes of the identified widget instances. Moreover, the method includes receiving a multi-widget-instance change definition, wherein the multi-widget-instance change definition articulates a specified change to unspecified widget instances which share a specified widget-instance attribute. Also, the method includes automatically identifying the unspecified widget instances based, at least in part, on a lookup of the specified widget-instance attribute in the widget-instance relationship data.

BRIEF DESCRIPTION OF THE DRAWINGS

A more complete understanding of the method and apparatus of the present invention may be obtained by reference to the following Detailed Description when taken in conjunction with the accompanying Drawings wherein:

FIGS. 6-7 illustrate examples of user interfaces that can be used to specify a multi-widget-instance change definition;

FIGS. 9-11 illustrate examples of user interfaces that can result from the process of FIG. 8.

DETAILED DESCRIPTION

In various embodiments, attributes of managed web widgets can be analyzed and manipulated more comprehensively via principles described herein. For purposes of this patent application, a web widget, often referred to herein simply as a widget, is a reusable software application that can be embedded within a website. Web widgets can include, for example, form builders, calendars, media viewers, and the like. A managed web widget, which may be periodically referenced herein simply as a managed widget, is a web widget that is centrally maintained on a content-management system for use by websites hosted thereby. Each use of a managed web widget by a website may be referenced herein as an instance of that managed web widget. A content-management system, as used herein, is a system that allows publishing, editing, modifying, and/or maintenance of content from a central interface. The content-management system can be based on, for example, Microsoft SharePoint®.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
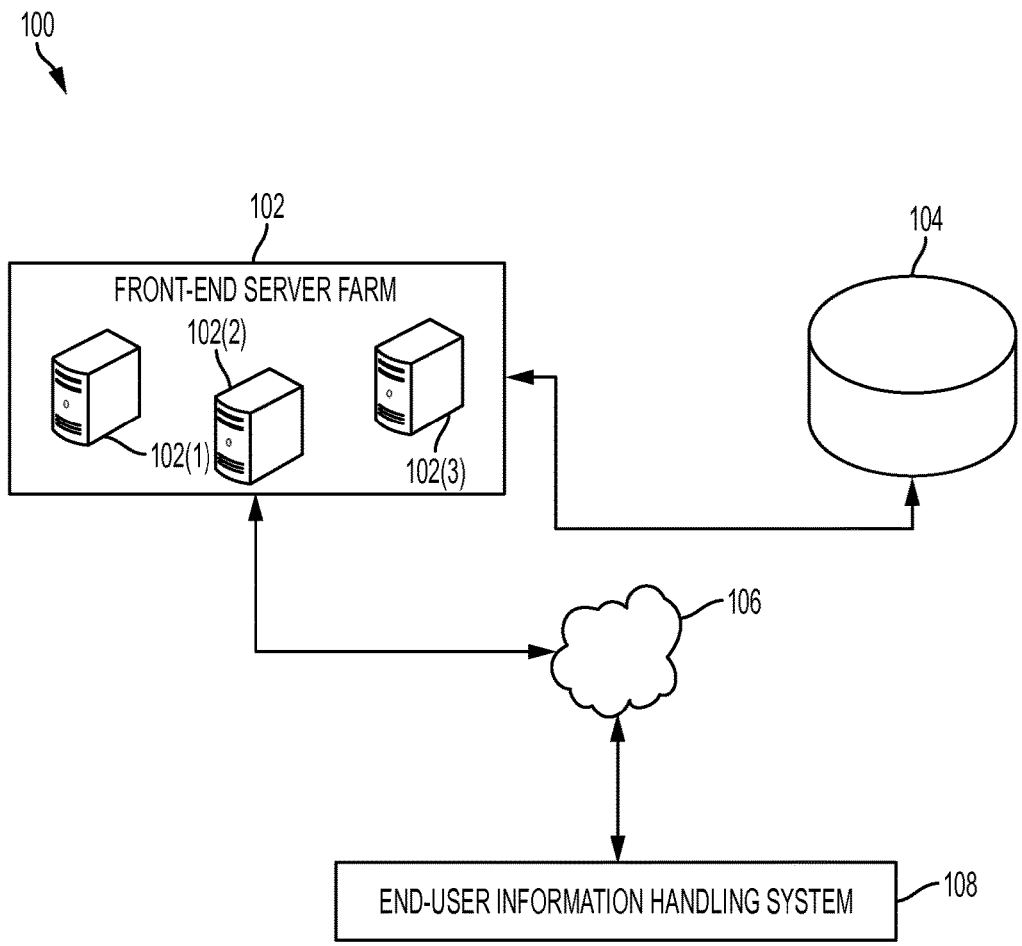
FIG. 1 illustrates a content-management system.

FIG. 1 illustrates a content-management system 100. The content-management system 100 includes a front-end server farm 102, one or more content databases 104, and end-user information handling systems 108. For simplicity of illustration, the front-end server farm 102 is depicted singly. However, in various implementations, the front-end server farm 102 can be representative of a plurality of front-end server farms. The one or more content databases 104 store content for the content-management system 100. In general, the one or more content databases 104 can include pages in which instances of web widgets are embedded, data sources utilized by web-widget instances such as, for example, lists, libraries and data stores, combinations of same and/or the like.

The front-end server farm 102 corresponds to an end-user facing portion of the content-management system 100 and is operable to serve websites containing content from the one or more content databases 104 over a communications network 106 to the end-user information handling systems 108. The communications network 106 can be, for example, the Internet or a public or private intranet. The front-end server farm 102 is shown to include front-end servers 102(1), 102(2), and 102(3). Although three front-end servers are shown for illustrative purposes, any number of physical or virtual server computers may be utilized in a given implementation. In addition, it should be appreciated that that the content-management system 100 may also include additional servers and databases to perform, for example, back-end functionality (i.e., functionality that is not end-user facing). As described in more detail with respect to FIGS. 2A and 2B, the front-end server farm 102 is operable to manage web widgets and extract and manipulate attributes of the managed web widgets.

Figure 2A:
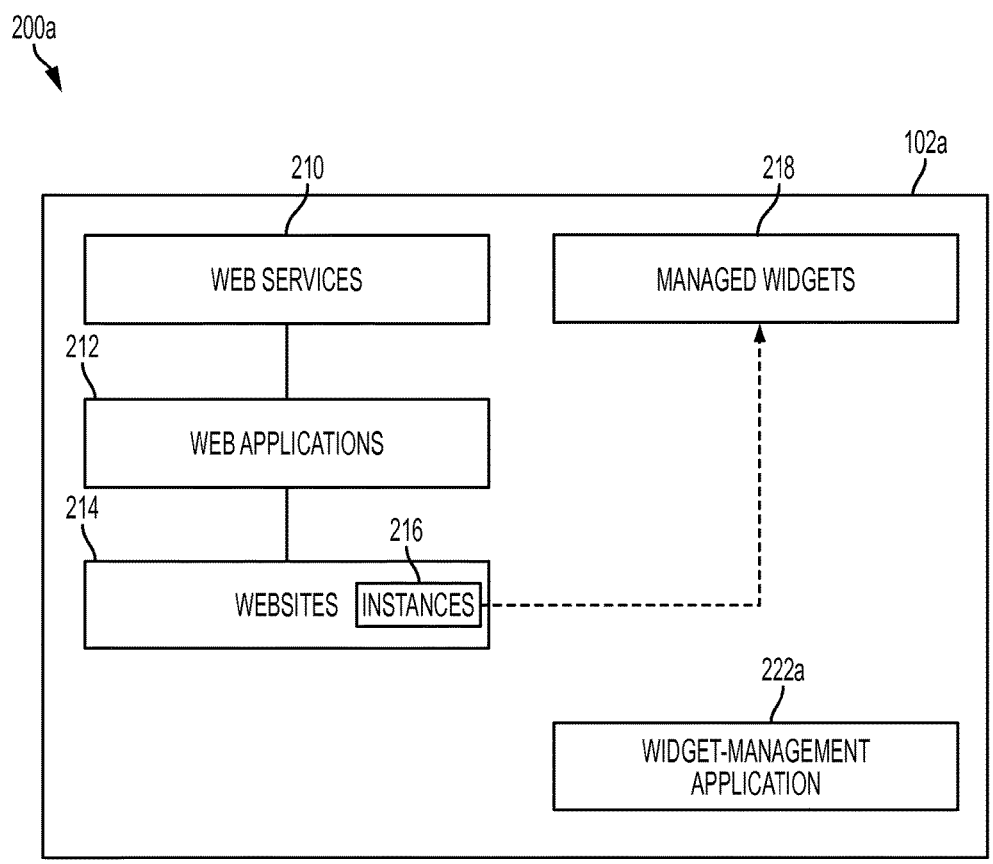
FIG. 2A illustrates a component view of a front-end server farm.

FIG. 2A illustrates a component view 200a of a front-end server farm 102a. In a typical embodiment, the front-end server farm 102a operates as described with respect to the front-end server farm 102 of FIG. 1. The front-end server farm 102a includes, inter alia, web services 210 and web applications 212. The web services 210 provide load-balancing services to front-end servers of the front-end server farm 102a. The web applications 212 provide functionality that allows the front-end server farm 102a to host websites 214 based on a distributed model. The web applications 212 can also manage user access and credentials. For example, in various embodiments, the web applications 212 can correspond to Internet Information Services (IIS) by Microsoft.

The front-end server farm 102a centrally manages a set of managed widgets 218 that are available for use by the websites 214. Each of the managed widgets 218 is typically identified by an identifier such as a globally unique identifier (GUID). The websites 214 are shown to include widget instances 216. As illustrated, the widget instances 216 are instances of the managed widgets 218 that are utilized on the websites 214. Stated somewhat differently, each of the widget instances 216 is an instance of one of the managed widgets 218 that is used on a particular website of the websites 214. It should be appreciated that some of the websites 214 can have more than one instance of the same widget of the managed widgets 218.

The front-end server farm 102a typically manages the websites 214 according to a management hierarchy that, for example, groups websites into collections and/or allows websites to have subsites. The management hierarchy permits management functionality described herein to be applied to websites and subsites individually or collectively. An example of the management hierarchy will be described with respect to FIG. 3. In various embodiments, there may be, for example, many thousands of instances of a given managed widget of the managed widgets 218.

In addition, the front-end server farm 102a has a widget-management application 222a resident and executing thereon. In some embodiments, the widget-management application 222a can itself be one of the managed widgets 218. The widget-management application 222a is operable to discover and manipulate attributes of the widget instances 216. In a typical embodiment, the widget-management application 222a acquires the attributes via extraction from the websites 214. The attributes can include, for example, data sources utilized by the widget instances 216, configuration properties of the widget instances 216 (e.g., configurable properties that affect how the widget instances 216 appear or behave), data fields utilized, front-end server farms responsible for the widget instances 216, network paths to the pages in which the widget instances 216 are embedded, textual descriptions of the widget instances 216, other metadata about the widget instances 216, combinations of same, and/or the like. In certain embodiments, this functionality enables attributes to be manipulated and/or managed across all instances of a given web widget. Examples of extraction, management and manipulation of attributes of the widget instances 216 will be described in greater detail with respect to the ensuing Figures.

Figure 2B:
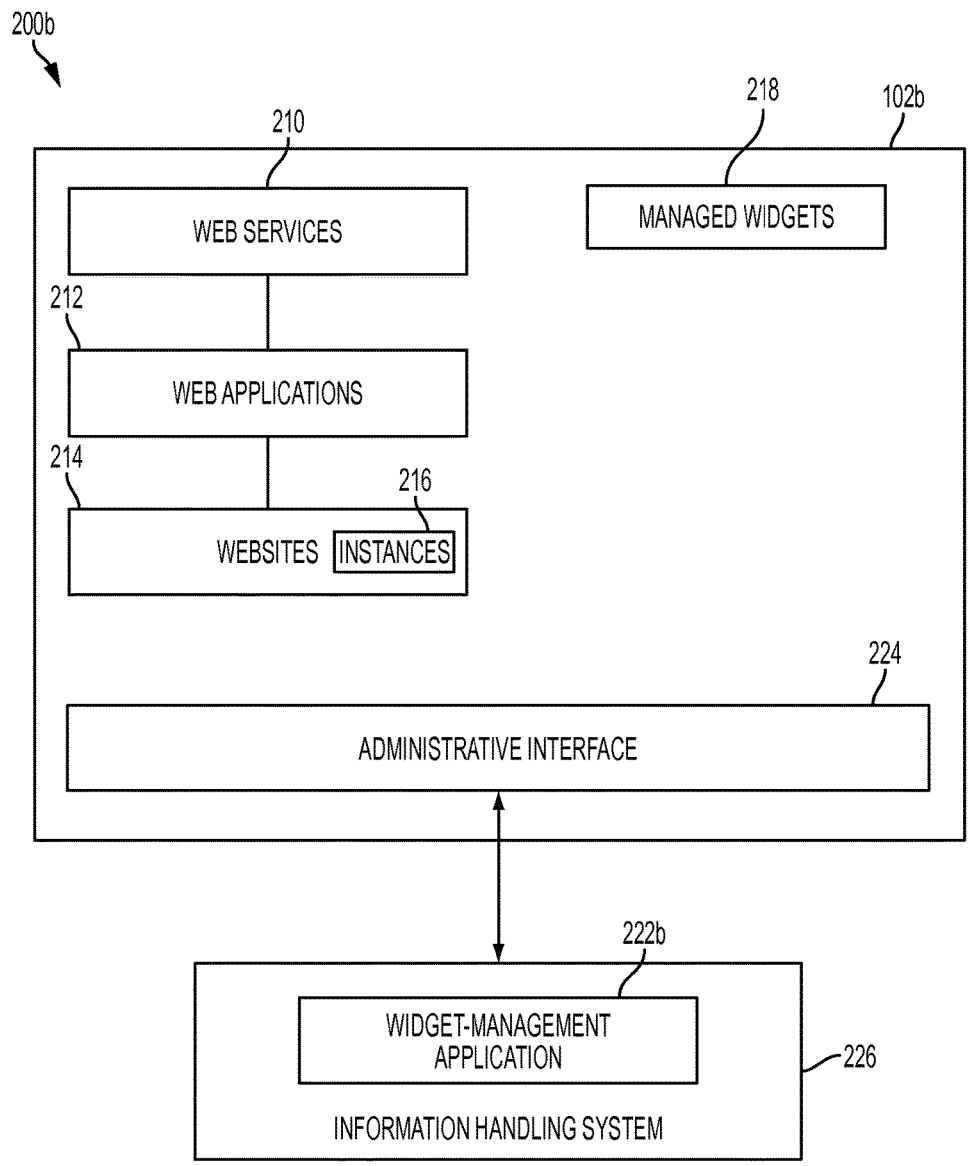
FIG. 2B illustrates a component view of a front-end server farm.

FIG. 2B illustrates a component view 200b of a front-end server farm 102b. The component view 200b is similar to the component view 200a except that a widget-management application 222b is external to the front-end server farm 102b and is resident and executing on an information handling system 226. The information handling system 226 can be, for example, an external web server, a client-computing device, or the like. In various embodiments, the widget-management application 222b is a cloud-based application that accesses the front-end server farm 102b through an administrative interface 224. For example, in various embodiments, the administrative interface 224 can be provided via central administration as provided by Microsoft SharePoint®. In this fashion, the widget-management application 222b uses the administrative interface 224 to perform the functionality described with respect to the widget-management application 222a of FIG. 2A.

Figure 3:
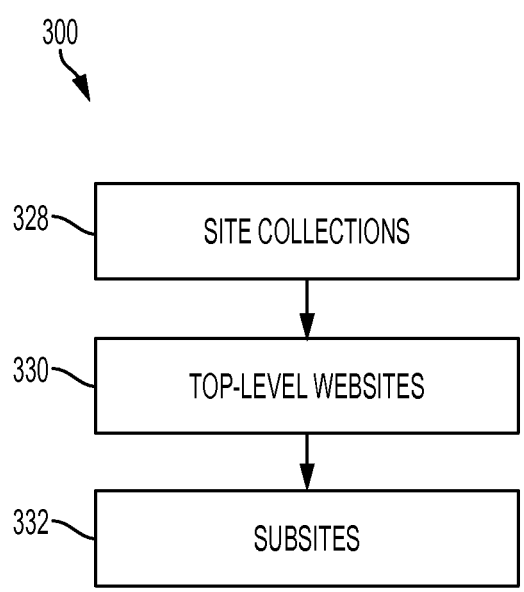
FIG. 3 illustrates a management hierarchy for websites.

FIG. 3 illustrates a management hierarchy 300 for websites such as, for example, the websites 214 of FIGS. 2A and 2B. It should be appreciated that the management hierarchy 300 is example in nature. Other management hierarchies may be utilized without deviating from the inventive principles outlined herein. The management hierarchy 300 includes site collections 328, top-level websites 330, and subsites 332.

Each of the top-level websites 330 represents components and resources used to create and manage a website such as, for example, themes and access to files, folders, and managed web widgets. The site collections 328 are above the top-level websites 330 in the management hierarchy 300. Each of the site collections 328 includes a subset of the top-level websites 330 that can be managed or manipulated as a group. The subsites 332 are beneath the top-level websites 330 in the management hierarchy 300. Each subsite of the subsites 332 is related to a top-level website of the top-level websites 330. However, the subsites 332, like the top-level websites 330, have access to files, folders, and managed web widgets.

Figure 4:
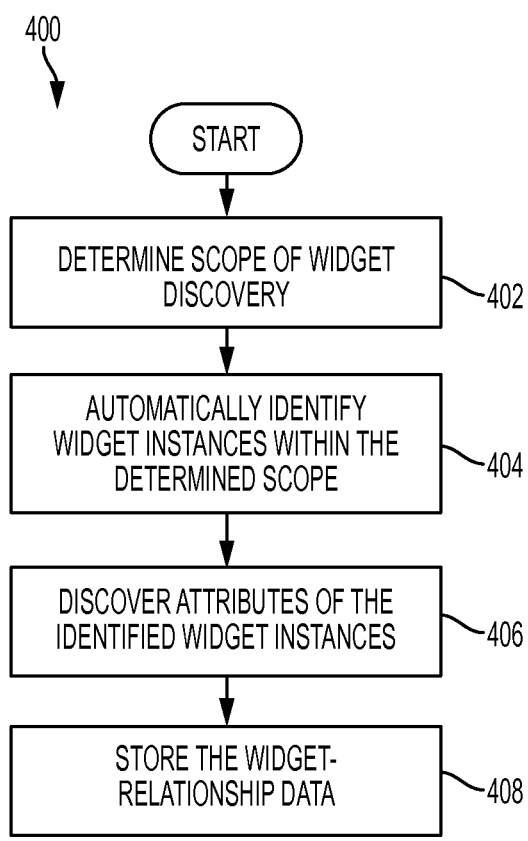
FIG. 4 illustrates an example of a process for discovering attributes of web-widget instances.

FIG. 4 illustrates an example of a process 400 for discovering attributes of web-widget instances. In a typical embodiment, the process 400 is performed by a widget-management application resident and executing on an information handling system. In various embodiments, the information handling system may be, for example, a front-end server computer of a content-management system as described with respect to FIG. 2A. In various other embodiments, the information handling system may be, for example, external to a given content-management system as described with respect to FIG. 2B. The process 400 begins at block 402.

At block 402, the widget-management application determines a scope of widget discovery in the content-management system 100. In an example, the scope can be all widgets utilized in a particular front-end server farm, all widgets utilized in a site collection, a top-level website or a subsite as described in relation to FIG. 3, combinations of same, and/or the like. In certain embodiments, the scope can be user-specified, a stored setting, etc.

At block 404, the widget-management application automatically identifies widget instances of the content-management system 100 that are within the scope of widget discovery determined at block 402. In general, the block 404 encompasses accessing all pages for all sites within the determined scope and identifying the web widgets referenced therein. For example, if the scope of widget discovery is a particular front-end server farm such as the front-end server farm 102 of FIG. 1, the widget-management application can access all pages managed by that front-end server farm and identify the web widgets referenced within those pages. In another example, if the scope of widget discovery is limited to a particular site collection such as one of the site collections 328 described in relation to FIG. 3, the widget-management application can access all pages within that site collection and identify the referenced web widgets.

At block 406, the widget-management application discovers attributes of the identified widget instances on a per widget-instance basis. The block 406 can include parsing the information accessed at block 404 to determine, for each widget instance, attributes such as data sources on which the widget instance relies, fields the widget instance uses, configuration properties of the widget instance, a front-end server farm responsible for the widget instance, a network path to the page in which the widget instance is embedded, a textual description of the widget instance, other metadata such as an identifier, combinations of same, and/or the like. Additional examples will of attribute discovery will now be described.

In an example, the page in which an example widget instance is embedded may indicate that the particular widget instance is populated by or uses a document library and a list that are stored, for example, in the one or more content databases 104. According to this example, the document library and the list can be considered data sources on which the example widget instance relies. Consequently, the extraction and identification of data sources used or relied upon by the example widget instance can constitute discovery of the data sources as attributes of the example widget instance.

In another example, the example widget instance may display data in certain fields that are defined for the example widget instance. According to this example, each field can be extracted from the page in which the example widget instance is embedded. In that way, the extraction and identification of fields used by the example widget instance can constitute discovery of those fields as attributes of the example widget instance.

In yet another example, the example widget instance can have configuration properties that affect how the example widget instance appears or behaves. In general, however, any configurable or customizable aspect of the example widget instance can be considered a configuration property. For instance, the example widget instance can have a configuration property that sets a user-interface skin to a color such as silver, gold, green, etc. According to this example, the configuration properties of the example widget instance, such as the configuration property for a user-interface skin color, can be extracted from the page in which the widget instance is embedded. Thus, the extraction and identification of configuration properties of the example widget instance can constitute discovery of those configuration properties as attributes of the example widget instance.

At block 408, the widget-management application stores in memory widget-relationship data for the identified widget instances. The widget-relationship data can include, for example, identifiers and/or values for each of the discovered attributes in relation to the widget instances for which the attributes are discovered. Widget instances can be identified in the widget-relationship data, for example, using a GUID for the widget of which it is an instance that is appended with a unique ID (e.g., a numerical ID) for the instance. In various embodiments, the widget-relationship data can be stored in a database such as the one or more content databases 104 of FIG. 1 and/or other memory.

Figure 5:
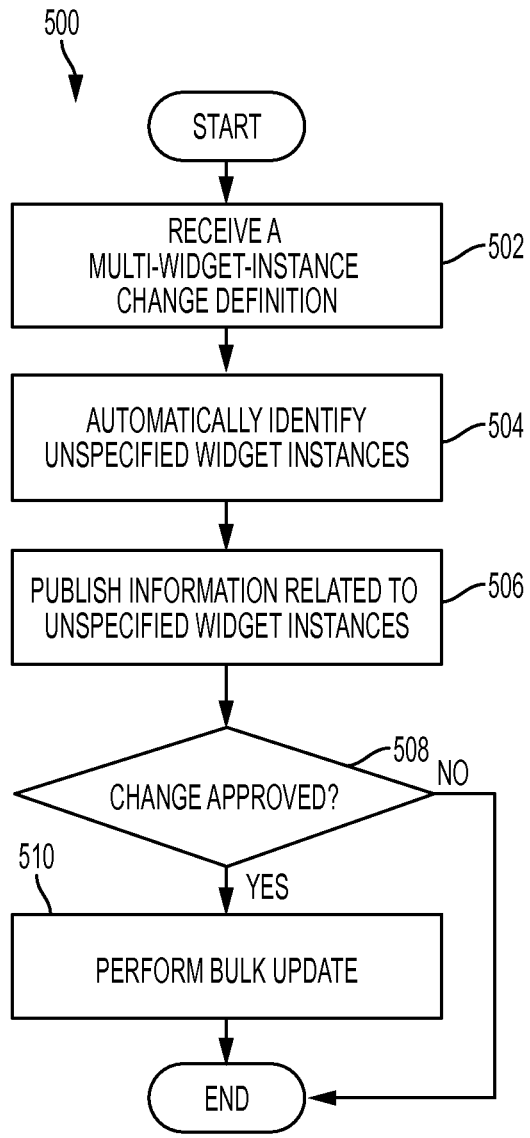
FIG. 5 illustrates an example of a process for dynamically updating attributes of widget instances.

FIG. 5 illustrates an example of a process 500 for dynamically updating attributes of widget instances. In a typical embodiment, the process 500 is performed by a widget-management application resident and executing on an information handling system. In various embodiments, the information handling system may be, for example, a front-end server computer of a content-management system as described with respect to FIG. 2A. In various other embodiments, the information handling system may be, for example, external to a given content-management system as described with respect to FIG. 2B. The process 500 begins at block 502.

At block 502, the widget-management application receives a multi-widget-instance change definition. In a typical embodiment, the multi-widget-instance change definition articulates a specified change to a set of unspecified widget instances. Stated somewhat differently, the widget instances to which the change is prospectively to be applied (i.e., the unspecified widget instances) are not identified to the widget-management application in the multi-instance change definition. Rather, the multi-widget-instance change definition typically specifies a widget-instance attribute that the unspecified widget instances should share.

In general, the widget-instance attribute that is specified can be any attribute of a widget instance described above. For example, the widget-instance attribute can be a data source (e.g., a list or library) such that the unspecified widget instances should be all widget instances which share or utilize the data source. In another example, the widget-instance attribute can be a widget type, i.e., an attribute that in some way characterizes the widgets of which the widget instances are instances. The widget type can be, for example, an identifier of a particular managed web widget, an identifier for a class or category of managed web widgets, etc.

Generally, the specified change in the multi-widget-instance change definition is a proposed change to one or more attributes of widget instances. That is, the specified change is a change not yet made. In an example, the multi-widget-instance change definition can specify an addition or removal of a particular field, a change to a data source or a structure thereof, a change to a configuration property such as user-interface skin color, etc.

At block 504, the widget-management application automatically identifies the unspecified widget instances using the widget-instance attribute specified in the multi-widget-instance change definition. For example, the widget-management application can look up the specified widget-instance attribute in widget-relationship data such as, for example, the widget-relationship data stored at block 408 of the process 400. According to this example, each widget instance that the widget-relationship data indicates to have the specified widget-instance attribute can be automatically identified as one of the unspecified widget instances.

At block 506, the widget-management application publishes information identifying the unspecified widget instances to a user interface. The block 506 can include causing a report containing the information to be displayed. Advantageously, in certain embodiments, the published information can serve a risk-management function. In particular, the published information can serve to warn an administrator, super user or other user about the ramifications of performing the change specified in the multi-widget-instance change definition.

At decision block 508, the widget-management application determines whether the change specified in the multi-widget-instance change definition has been approved. For example, in certain embodiments, the widget-management application can allow a user to indicate on a user interface that the change is approved. If it is determined at the decision block 508 that the change has not been approved, the process 500 ends without the change being performed. Otherwise, if it is determined at the decision block 508 that the change has been approved, the process 500 proceeds to block 510. At block 510, the widget-management application bulk updates the unspecified widget instances, for example, by writing the change to the corresponding pages using the network path stored in the widget-relationship data.

Figure 6:
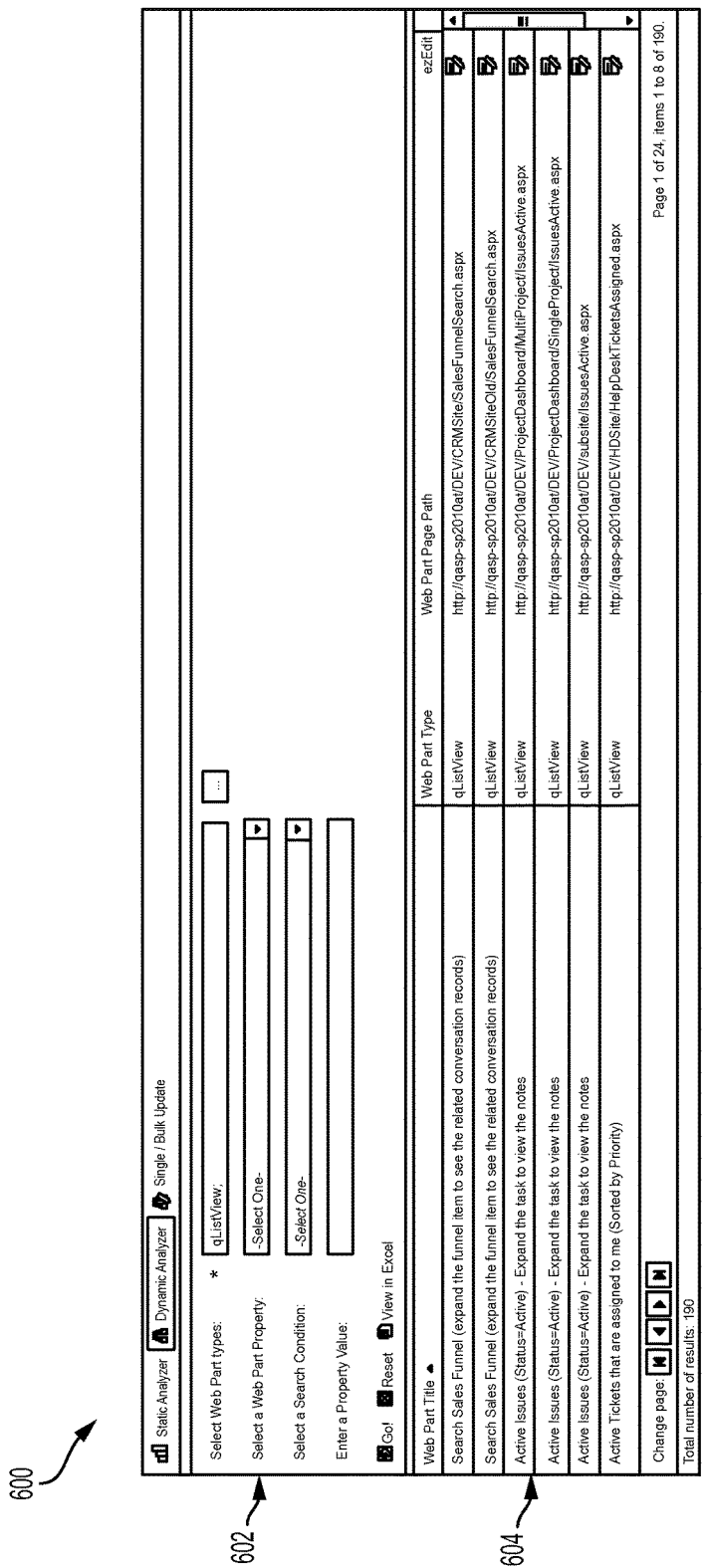

FIG. 6 illustrates an example of a user interface 600 that can be used to specify a multi-widget-instance change definition and obtain dynamic analysis results related thereto. Specifically, the user interface 600 illustrates an example implementation using Microsoft SharePoint®. In the example implementation, web parts can be considered widgets as described above.

In the illustrated embodiment, the user interface 600 includes a specification portion 602 and a dynamic results portion 604. The specification portion 602 includes a number of fields in which a user can specify the multi-widget-instance change definition. In the example shown, the multi-widget-instance change definition specifies a widget-instance attribute of "qListView," which attribute corresponds to a widget type. Information related to widget instances having the widget-instance attribute of "qListView" as a widget type are shown in the dynamic results portion 604. In certain embodiments, the dynamic results portion 604 can be a product of blocks 504 and 506 of FIG. 5.

FIG. 7 illustrates an example of a user interface 700 that can be used to specify a multi-widget-instance change definition and obtain dynamic analysis results related thereto. Once again, the user interface 700 illustrates an example implementation using Microsoft SharePoint®.

In the illustrated embodiment, the user interface 700 includes a specification portion 702 and a dynamic results portion 704. The specification portion 702 includes a number of fields in which a user can specify the multi-widget-instance change definition. In the example shown, more than one widget-instance attribute is specified. In particular, as shown, the multi-widget-instance change definition specifies a widget-instance attribute of "qListView," which attribute corresponds to a widget type. In addition, the multi-widget-instance change definition specifies a widget-instance attribute of "Skin Name" that equals "Windows 7." In other words, this additional widget-instance attribute serves to further restrict a set of unspecified widget instances to those having a configuration property equal to "Windows 7." Furthermore, the specification portion 702 articulates a change to the widget-instance attribute of "Skin Name." Specifically, a new value is shown to be "MetroTouch."

Information related to widget instances having the specified widget-instance attributes are shown in the dynamic results portion 704. In certain embodiments, the dynamic results portion 704 can be a product of blocks 504 and 506 of FIG. 5. As illustrated, a user can use the user interface 700 to bulk apply the change to the widget-attribute of "Skin Name" to all applicable widget instances in the manner described in relation to block 510 FIG. 5.

Figure 8:
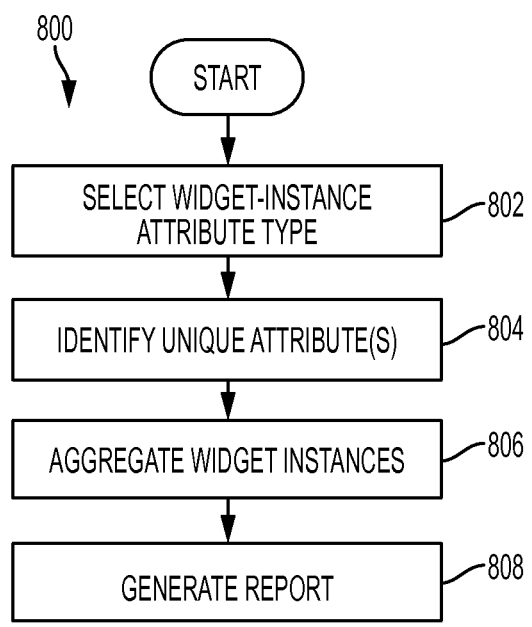
FIG. 8 illustrates an example of a process for analyzing widget-relationship data.

FIG. 8 illustrates an example of a process 800 for analyzing widget-relationship data. In some embodiments, the process 800 can be triggered by an administrator, super user or other user. In some embodiments, the process 800 can be performed automatically after a discovery process such as the process 400 of FIG. 4 is performed. In these embodiments, multiple iterations of the process 400 can be performed, for example, for purposes of performing distinct analyses.

In a typical embodiment, the process 800 is performed by a widget-management application resident and executing on an information handling system. In various embodiments, the information handling system may be, for example, a front-end server computer of a content-management system as described with respect to FIG. 2A. In various other embodiments, the information handling system may be, for example, external to a given content-management system as described with respect to FIG. 2B. The process 800 begins at block 802.

At block 802, the widget-management application selects a widget-instance attribute type by which to group widget instances represented in widget-relationship data. The widget-relationship data can be similar, for example, to the widget-relationship data described in relation to block 408 of FIG. 4. In various embodiments, the selected widget-instance attribute type can be any classification of attributes such as, for example, attributes identifying data sources utilized by the widget instances (i.e., data-source attributes), attributes identifying front-end server farms responsible for the widget instances (i.e., farm attributes), attributes identifying configuration properties of the widget instances (i.e., configuration attributes), attributes identifying data fields utilized (i.e., data-field attributes), attributes identifying network paths to the pages in which the widget instances are embedded (i.e., path attributes), attributes including textual descriptions of the widget instances, attributes identifying a widget type, attributes including other metadata about the widget instances, combinations of same, and/or the like. In some embodiments, the selected widget-instance attribute type can be specified by a user who triggers the process 800. In other embodiments, the selected widget-instance attribute type can be pre-specified, for example, via a stored setting.

At block 804, the widget-management application identifies each unique attribute, in the widget-relationship data, of the selected attribute type. For example, if the selected attribute type is data-source attributes, the widget-management application can identify each unique data source among the data sources represented in the widget-relationship data. In another example, if the selected attribute type is a data-field attributes, the widget-management application can identify each unique data-field type among the configuration properties represented in the widget-relationship data. In yet another example, if the selected attribute type is a widget type, the widget-management application can identify each unique widget type among the widget instances represented in the widget-relationship data. In still another example, if the selected attribute type is farm attributes, the widget-management application can identify each unique front-end server farm that is used for the widget instances represented in the widget-relationship data.

At block 806, the widget-management application aggregates the widget instances represented in the widget-relationship data by the selected attribute type. That is, for each unique attribute, the widget-management application can indicate the widget instances which have that unique attribute. At block 808, the widget-management application generates a report indicating the aggregations from block 806. In some embodiments, the widget-management application can cause the report to be displayed to an administrator, super user or other user. In other embodiments, the report can be stored for on-demand access by an administrator, super user or other user.

FIG. 9 illustrates an example of a user interface 900 that can result from the process 800 of FIG. 8. For illustrative purposes, FIG. 9 relates to an example implementation using Microsoft SharePoint®. The user interface 900 includes a report 902 which lists widget instances for a selected site of a selected web application of a selected front-end server farm, web application and site.

Figure 10:
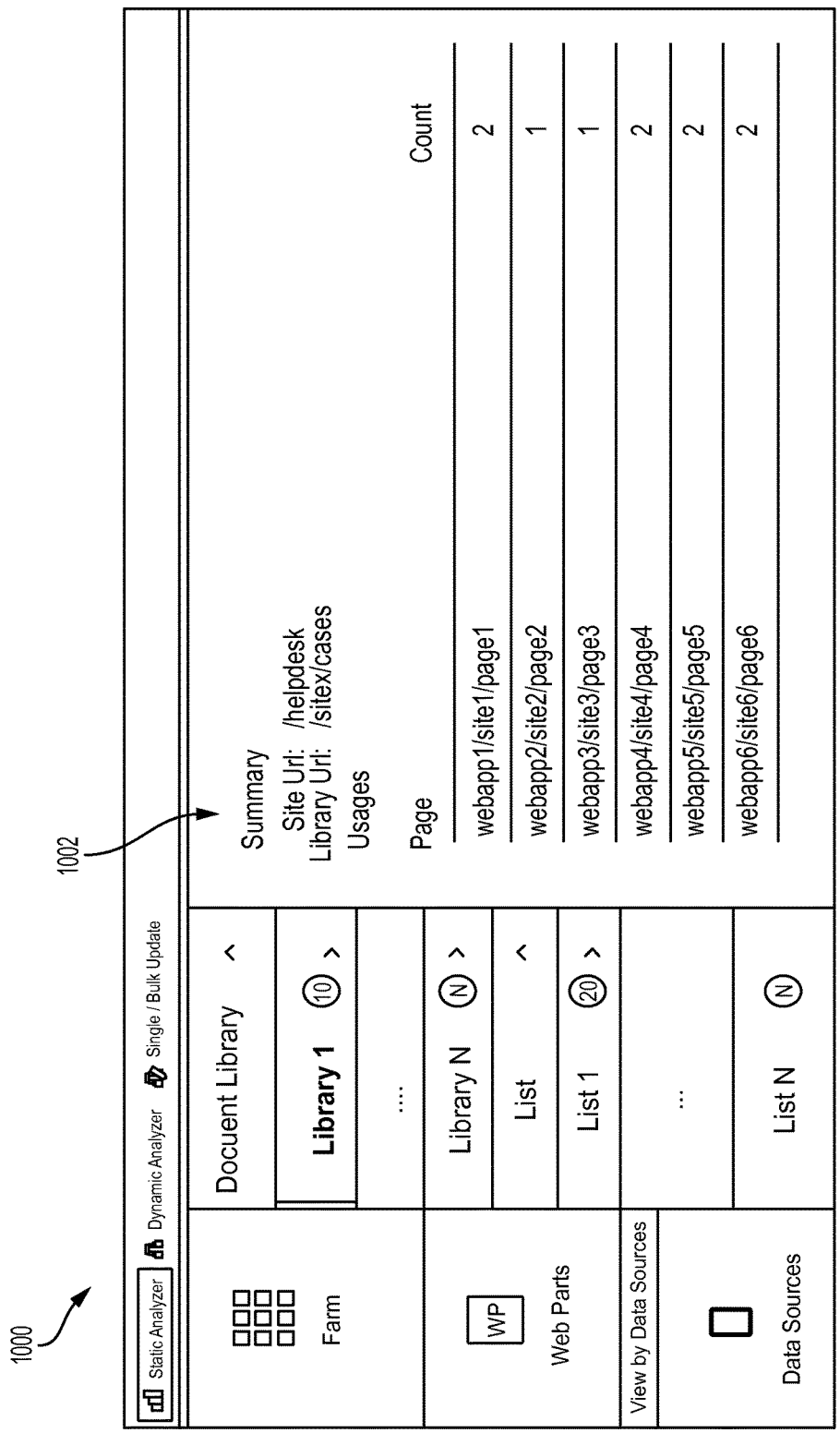

FIG. 10 illustrates an example of a user interface 1000 that can result from the process 800 of FIG. 8. For illustrative purposes, FIG. 10 relates to an example implementation using Microsoft SharePoint®. The user interface 1000 includes a report 1002 which lists widget instances that utilize a selected data source (e.g., a selected list).

FIG. 11 illustrates an example of a user interface 1100 that can result from the process 800 of FIG. 8. For illustrative purposes, FIG. 11 relates to an example implementation using Microsoft SharePoint®. The user interface 1100 includes a report 1102 which lists widget instances that are of a selected widget type (i.e., widget instances that are instances of a "qSelector" widget).

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by a computer system:
determining a scope of widget discovery in a content-management system;
automatically identifying widget instances of the content-management system that are within the determined scope of widget discovery;
discovering attributes of the identified widget instances on a per widget-instance basis;
storing in memory widget-instance relationship data comprising the discovered attributes of the identified widget instances;
receiving a multi-widget-instance change definition, wherein the multi-widget-instance change definition articulates a specified change to unspecified widget instances that share a specified widget-instance attribute, wherein the unspecified widget instances are not identified to the computer system in the multi-widget-instance change definition;
responsive to the receiving of the multi-widget-instance change definition, automatically identifying, from among the identified widget instances, the unspecified widget instances that share the specified widget-instance attribute based, at least in part, on a lookup of the specified widget-instance attribute in the widget-instance relationship data;
publishing information related to the identified unspecified widget instances to a user interface; and
responsive to receiving change approval, bulk updating the identified unspecified widget instances as indicated in the specified change.

2. The method of claim 1, wherein the discovering attributes comprises:
determining data sources of the widget instances on a per widget-instance basis;
determining configuration properties of the widget instances on a per widget-instance basis; and
determining network paths of the widget instances on a per widget-instance basis.

3. The method of claim 2, wherein:
the specified change to the unspecified widget instances comprises a change to at least one data source of the determined data sources;
the specified widget-instance attribute comprises an identifier of the at least one data source; and
the automatically identifying the unspecified widget instances comprises determining, from the widget-instance relationship data, those of the identified widget instances that utilize the at least one data source.

4. The method of claim 2, wherein:
the specified change comprises a change to one or more configuration properties of a web widget;
the specified widget-instance attribute comprises an identifier of the web widget; and
the automatically identifying the unspecified widget instances comprises determining, from the widget-instance relationship data, those of the identified widget instances that are instances of the web widget.

5. The method of claim 2, comprising:
identifying unique data sources among the determined data sources;
aggregating the widget instances by the unique data sources; and
generating a report comprising information related to the aggregated widget instances.

6. The method of claim 2, comprising:
determining unique widgets of which the widget instances are instances;
aggregating the widget instances by unique widgets; and
generating a report comprising information related to the aggregated widget instances.

7. An information handling system comprising a processor, wherein the processor is operable to implement a method comprising:
determining a scope of widget discovery in a content-management system;
automatically identifying widget instances of the content-management system that are within the determined scope of widget discovery;
discovering attributes of the identified widget instances on a per widget-instance basis;
storing in memory widget-instance relationship data comprising the discovered attributes of the identified widget instances;
receiving a multi-widget-instance change definition, wherein the multi-widget-instance change definition articulates a specified change to unspecified widget instances that share a specified widget-instance attribute, wherein the unspecified widget instances are not identified to the information handling system in the multi-widget-instance change definition;
responsive to the receiving of the multi-widget-instance change definition, automatically identifying, from among the identified widget instances, the unspecified widget instances that share the specified widget-instance attribute based, at least in part, on a lookup of the specified widget-instance attribute in the widget-instance relationship data;
publishing information related to the identified unspecified widget instances to a user interface; and
responsive to receiving change approval, bulk updating the identified unspecified widget instances as indicated in the specified change.

8. The information handling system of claim 7, wherein the discovering attributes comprises:
determining data sources of the widget instances on a per widget-instance basis;
determining configuration properties of the widget instances on a per widget-instance basis; and
determining network paths of the widget instances on a per widget-instance basis.

9. The information handling system of claim 8, wherein:
the specified change to the unspecified widget instances comprises a change to at least one data source of the determined data sources;
the specified widget-instance attribute comprises an identifier of the at least one data source; and
the automatically identifying the unspecified widget instances comprises determining, from the widget-instance relationship data, those of the identified widget instances that utilize the at least one data source.

10. The information handling system of claim 8, wherein:
the specified change comprises a change to one or more configuration properties of a web widget;
the specified widget-instance attribute comprises an identifier of the web widget; and
the automatically identifying the unspecified widget instances comprises determining, from the widget-instance relationship data, those of the identified widget instances that are instances of the web widget.

11. The information handling system of claim 8, the method comprising:
- identifying unique data sources among the determined data sources;
- aggregating the widget instances by the unique data sources; and
- generating a report comprising information related to the aggregated widget instances.

12. The information handling system of claim 8, comprising:
- determining unique widgets of which the widget instances are instances;
- aggregating the widget instances by unique widgets; and
- generating a report comprising information related to the aggregated widget instances.

13. A computer-program product comprising a non-transitory computer-usable medium having computer-readable program code embodied therein, the computer-readable program code adapted to be executed to implement a method comprising:
- determining a scope of widget discovery in a content-management system;
- automatically identifying widget instances of the content-management system that are within the determined scope of widget discovery;
- discovering attributes of the identified widget instances on a per widget-instance basis;
- storing in memory widget-instance relationship data comprising the discovered attributes of the identified widget instances;
- receiving a multi-widget-instance change definition, wherein the multi-widget-instance change definition articulates a specified change to unspecified widget instances that share a specified widget-instance attribute, wherein the unspecified widget instances are not identified in the multi-widget-instance change definition;
- responsive to the receiving of the multi-widget-instance change definition, automatically identifying, from among the identified widget instances, the unspecified widget instances that share the specified widget-instance attribute based, at least in part, on a lookup of the specified widget-instance attribute in the widget-instance relationship data;
- publishing information related to the identified unspecified widget instances to a user interface; and
- responsive to receiving change approval, bulk updating the identified unspecified widget instances as indicated in the specified change.

14. The computer-program product of claim 13, wherein the discovering attributes comprises:
- determining data sources of the widget instances on a per widget-instance basis;
- determining configuration properties of the widget instances on a per widget-instance basis; and
- determining network paths of the widget instances on a per widget-instance basis.

15. The computer-program product of claim 14, wherein:
- the specified change to the unspecified widget instances comprises a change to at least one data source of the determined data sources;
- the specified widget-instance attribute comprises an identifier of the at least one data source; and
- the automatically identifying the unspecified widget instances comprises determining, from the widget-instance relationship data, those of the identified widget instances that utilize the at least one data source.

16. The computer-program product of claim 14, wherein:
- the specified change comprises a change to one or more configuration properties of a web widget;
- the specified widget-instance attribute comprises an identifier of the web widget; and
- the automatically identifying the unspecified widget instances comprises determining, from the widget-instance relationship data, those of the identified widget instances that are instances of the web widget.

17. The computer-program product of claim 14, the method comprising:
- identifying unique data sources among the determined data sources;
- aggregating the widget instances by the unique data sources; and
- generating a report comprising information related to the aggregated widget instances.

* * * * *